US006263364B1

(12) United States Patent
Najork et al.

(10) Patent No.: US 6,263,364 B1
(45) Date of Patent: Jul. 17, 2001

(54) WEB CRAWLER SYSTEM USING PLURALITY OF PARALLEL PRIORITY LEVEL QUEUES HAVING DISTINCT ASSOCIATED DOWNLOAD PRIORITY LEVELS FOR PRIORITIZING DOCUMENT DOWNLOADING AND MAINTAINING DOCUMENT FRESHNESS

(75) Inventors: Marc Alexander Najork, Palo Alto; Clark Allan Heydon, San Francisco; Janet Lynn Wiener, Sunnyvale, all of CA (US)

(73) Assignee: Alta Vista Company, Palo Alto, CA (US)

( * ) Notice: Subject to any disclaimer, the term of this patent is extended or adjusted under 35 U.S.C. 154(b) by 0 days.

(21) Appl. No.: 09/433,007

(22) Filed: Nov. 2, 1999

(51) Int. Cl.[7] .......................... G06F 15/16; G06F 15/173
(52) U.S. Cl. .......................... 709/217; 709/201; 709/226
(58) Field of Search .................................. 709/217, 201, 709/226, 223, 225; 710/5; 707/10, 3, 104

(56) References Cited

U.S. PATENT DOCUMENTS

| | | | |
|---|---|---|---|
| 5,907,837 | * 5/1999 | Ferrel et al. | 707/3 |
| 5,974,455 | * 10/1999 | Monier | 709/223 |
| 6,145,003 | * 11/2000 | Sanu et al. | 709/225 |
| 6,157,963 | * 12/2000 | Courtright, II et al. | 710/5 |
| 6,182,085 | * 1/2001 | Eichstaedt et al. | 707/104 |
| 6,192,364 | * 2/2001 | Baclawski | 707/10 |

* cited by examiner

*Primary Examiner*—Le Hien Luu
(74) *Attorney, Agent, or Firm*—Pennie & Edmonds LLP

(57) ABSTRACT

A web crawler downloads documents from among a plurality of host computers. The web crawler enqueues document addresses in a data structure called the Frontier. The Frontier generally includes a set of queues, with all document addresses sharing a respective common host component being stored in a respective common one of the queues. Multiple threads substantially concurrently process the document addresses in the queues. The Frontier includes a set of parallel "priority queues," each associated with a distinct priority level. Queue elements for documents to be downloaded are assigned a priority level, and then stored in the corresponding priority queue. Queue elements are then distributed from the priority queues to a set of underlying queues in accordance with their relative priorities. The threads then process the queue elements in the underlying queues. When performing a continuous crawl, the web crawler reinserts the queue element for a downloaded document into the Frontier in accordance with a download priority level associated with the downloaded document. For example, the download priority level may be determined as a function of an expiration date and time associated with document whose document address is denoted by the queue element.

30 Claims, 12 Drawing Sheets

132

| TABLE | |
|---|---|
| HOST IDENTIFIERS | QUEUE IDS |
| A | 0 |
| B | 1 |
| C | 2 |
| ... | ... |
| H | n-1 |

308 — HOST IDENTIFIERS
309 — QUEUE IDS

WEB CRAWLER SYSTEM USING PLURALITY OF PARALLEL PRIORITY LEVEL QUEUES HAVING DISTINCT ASSOCIATED DOWNLOAD PRIORITY LEVELS FOR PRIORITIZING DOCUMENT DOWNLOADING AND MAINTAINING DOCUMENT FRESHNESS

The present invention relates to a system and method for accessing documents, called web pages, on the world wide web (WWW) and, more particularly, to a method for associating an extensible set of data with each document downloaded by a web crawler.

BACKGROUND OF THE INVENTION

Documents on interconnected computer networks are typically stored on numerous host computers that are connected over the networks. For example, so-called "web pages" are stored on the global computer network known as the Internet, which includes the world wide web. Each web page on the world wide web has a distinct address called its uniform resource locator (URL), which identifies the location of the web page. Most of the documents on the world wide web are written in standard document description languages (e.g., HTML, XML). These languages allow an author of a document to create hypertext links to other documents. Hypertext links allow a reader of a web page to quickly move to other web pages by clicking on their respective links. These links are typically highlighted in the original web page. A web page containing hypertext links to other web pages generally refers to those pages by their URL's. Links in a web page may refer to web pages that are stored in the same or different host computers.

A web crawler is a program that automatically finds and downloads documents from host computers in networks such as the world wide web. When a web crawler is given a set of starting URL's, the web crawler downloads the corresponding documents, extracts any URL's contained in those downloaded documents and downloads more documents using the newly discovered URL's. This process repeats indefinitely or until a predetermined stop condition occurs. As of 1999 there were approximately 500 million web pages on the world wide web and the number is continuously growing; thus, web crawlers need efficient data structures to keep track of downloaded documents and any discovered addresses of documents to be downloaded.

Collecting Information About Documents Downloaded by a Web Crawler

After a document is downloaded by the web crawler, the web crawler may extract and store information about the downloaded page. For instance, the web crawler may determine if the downloaded page contains any new URL's not previously known to the web crawler, and may enqueue those URL's for later processing. In addition, pages downloaded by the web crawler may be processed by a sequence of processing modules. For instance, one processing module might determine whether the document has already been included in a web page index, and whether the page has changed by more than a predefined amount since its entry in the web page index was last updated. Another processing module might add or update a document's entry in the web page index. Yet another processing module might look for information of a specific type in the downloaded documents, extract the information and store it in a directory or other data structure.

During the course of processing a downloaded document, various data can be collected about it. Examples include the date and time of the download, how long it took to perform the download, whether the download was successful, the document's size, its MIME type, the date and time it was last modified, its expiration date and time, and a checksum of its contents. These data can be used for a variety of purposes, including, but not limited to:

passing information from one processing module to a later processing module in a processing pipeline;

collecting statistics about the downloaded documents; and in the context of a continuous web crawler, the collected data can be used as a basis for determining when a document should next be downloaded (refreshed).

After a document has been processed, its associated data can be saved to disk and analyzed off line.

A continuous web crawler is one that automatically refreshes a database of information about the pages it has downloaded. A web page can have an assigned or purported expiration date and time, which indicates when the page should be assumed to be no longer valid. Furthermore, a web crawler can be configured to assume that certain types of pages, such as pages on certain types of web sites, cannot be valid for more that a particular length of time.

Thus, pages on a news web site might be assumed to be valid for only a few hours, while pages of an on line encyclopedia might be assumed to be valid for a much longer time, such as month.

In the context of a continuous web crawler, it may be advantageous to record not only the data associated with a document's most recent download, but also with its previous downloads. How complete a document download history to keep may vary depending on the user's requirements.

The Scooter web crawler used by AltaVista saves a fixed set of data for each document it discovers and downloads, namely, the document's URL, the number of attempts that have been made to download it, the date and time of the last download attempt, the HTTP status code of the last download, and the document's last modification date and time.

The Sphinx web crawler developed by Bharat and Miller allows document classifiers to associate name/value pairs with a downloaded page. However, Sphinx discards any name/value pairs associated with a document once the document has been processed. Moreover, the values must be strings, not values of arbitrary types.

It would be desirable to provide a much more flexible mechanism that enables application programs that process downloaded pages to determine what information to save for each document downloaded. In that way the data structure for storing such information would be dynamically determined, and the manner in which that information is used would be dynamically determined, without having to customize the code of the web crawler for each application.

Prioritizing Document Downloads

Every web crawler must maintain a data structure or set of data structures reflecting the set of URL's that still must be downloaded. In this document, that set of data structures is called "the Frontier." The crawler repeatedly selects a URL from the Frontier, downloads the corresponding document, processes the downloaded document, and then either removes the URL from the Frontier or reschedules it for downloading again at a later time. The latter scheme is used for so-called "continuous" web crawlers.

When selecting a URL from the Frontier, the inventors have determined that it would often be desirable for the crawler to preferentially select certain URL's over others so as to maximize the quality of the information processed by the other applications to which the web crawler passes downloaded documents. For instance, the web crawler may pass downloaded pages to a document indexer. An index of documents on an Intranet or the Internet will be more accurate or higher quality if the documents of most interest to the users of the index have been preferentially updated so as to make sure that those documents are accurately represented in the index. To accomplish this, the web crawler might preferentially select URL's on web servers with known high quality content. Alternately, heuristics might be used to gauge page quality. For instance, shorter URL's might be considered to be better candidates than longer URL's.

In the context of a continuous web crawler, it may be desirable to prefer URL's on web servers whose content is known to change rapidly, such as news sites. It may be desirable to prefer newly-discovered URL's over those that have been previously processed. Among the previously processed URL's, it may be advantageous to prefer URL's whose content has changed between the previous two downloads over URL's whose content has not changed, and to prefer URL's with shorter expiration dates over those with longer expiration dates.

Maintaining Freshness of Documents Downloaded by a Continuous Web Crawler

As alluded to earlier, web crawlers are traditionally used to collect documents from the world wide web, as well as from Intranets, for some purpose, the most common of which is to build an index for a search engine. However, since many of the documents on the web and on Intranets change over time, at any given point in time, some fraction of any web index will contain stale content.

There are two obvious approaches to refreshing an index. One is to perform repeated complete or "scratch" crawls to rebuild the index from scratch. The disadvantage of this approach is that many of the documents may not have changed between the two scratch crawls, in which case valuable computer resources will be wasted unnecessarily refetching and processing documents. Another approach is to perform a more targeted crawl, but it is difficult to know a priori which documents need to be refetched, since the web does not include an invalidation mechanism. That is, the only way to discover that a page has changed is to query its web server.

Therefore it would be desirable to have a mechanism for keeping the results of a crawl up to date, using a continuous crawl that is somehow biased toward pages that are most likely to have been changed since the last time the crawler fetched them.

SUMMARY OF THE INVENTION

A web crawler downloads documents from among a plurality of host computers. The web crawler enqueues document addresses in a data structure called the Frontier. The Frontier generally includes a set of queues, with all document addresses sharing a respective common host component being stored in a respective common one of the queues. Multiple threads substantially concurrently process the document addresses in the queues.

The Frontier includes a set of parallel "priority queues," each associated with a distinct priority level. Queue elements for URL's to be downloaded are assigned a priority level, and then stored in the corresponding priority queue. Queue elements are then distributed from the priority queues to a set of underlying queues in accordance with their relative priorities. The threads then process the queue elements in the underlying queues.

In another aspect of the present invention, the web crawler performs a continuous crawl. The URL element for each downloaded document is assigned a priority level and then reinserted into the Frontier, in the priority queue corresponding to the assigned priority level. The priority level is determined as a function of the extensible set of data stored with the queue element. Each queue element for a newly found URL is also assigned a priority level. That priority level is based on the fact that it is a newly found URL and may also be based on properties of the URL itself, or the web page on which the URL was found.

In another aspect of the present invention, the web crawler includes a set of tools for storing an extensible set of data with each document address (URL) in the Frontier. These tools enable the applications to which the web crawler passes downloaded documents to store a record of information associated with each download, where each record of information includes a set of name/value pairs specified by the applications. The applications also determine how many records of information to retain for each URL, when to delete records of information, and so on.

DETAILED DESCRIPTION OF PREFERRED EMBODIMENTS

Figure 1:
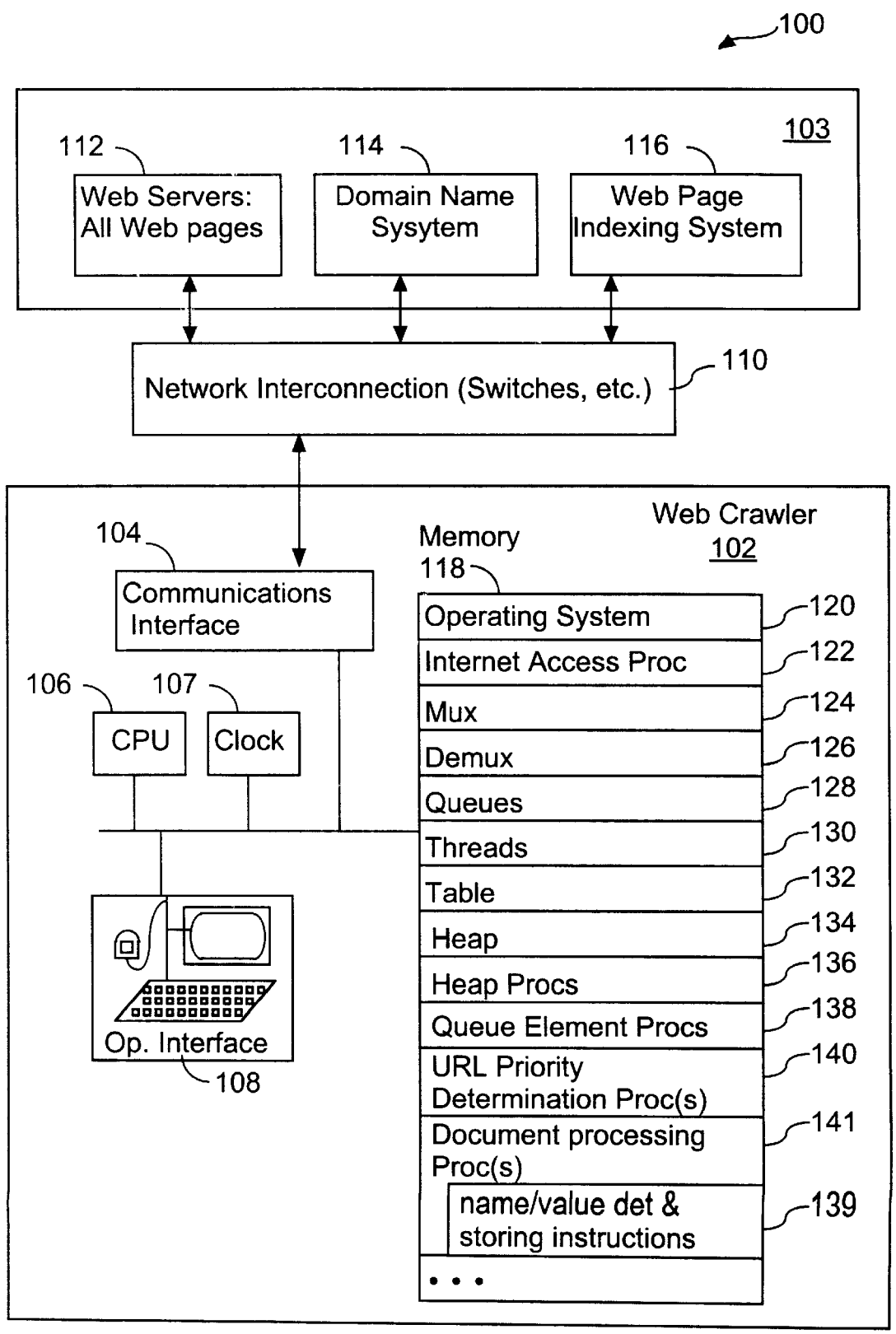
FIG. 1 is a block diagram of a distributed computer system illustrating an exemplary embodiment of the invention.

FIG. 1 shows an exemplary embodiment of a distributed computer system 100. The distributed computer system 100 includes a web crawler 102 connected to a network 103 through a network interconnection 110. The network 103 may be a global communication network, such as the Internet, or a private network, sometimes called an Intranet. Examples of the network interconnection 110 include switches, routers, etc. The network 103 includes web servers 112 and a service known as a domain name system 114. It may also optionally include a web page indexing system 116. The web servers 112 store web pages. The domain name system 114 is a distributed database that provides the mapping between Internet protocol (IP) addresses and host names. The domain name system 114 is a distributed system because no single site on the Internet has the domain name mapping information for all the web servers in the network. Each site participating in the domain name system 114 maintains its own database of information and runs a server program that other systems across the network can query. The domain name system 114 provides the protocol that allows clients and servers to communicate with each other. Any application may look up the IP address (or addresses) corresponding to a given host name or the host name corresponding to a given IP address in the domain name system 114. An application accesses the domain name system 114 through a resolver. The resolver contacts one or more name servers to perform a mapping of a host name to the corresponding IP address, or vice versa. A given host name may be associated with more than one IP address because a host may have multiple interfaces, with each interface of the host having a unique IP address. Also, a host may be replicated on multiple computers, each having its own IP address, but providing access to the same information.

The web page indexing system 116 includes an index of words used on the world wide web and addresses of the web pages that use each word. Such indexing systems are maintained by various search engines, such as the AltaVista search engine. The domain name system 114 and the web page indexing system 116 may be accessed by the web crawler 102 in the process of downloading web pages from the world wide web.

The web crawler 102 includes a communications interface 104, one or more central processing units (CPU's) 106, a clock circuit 107 for keeping track of the current time, an operator interface 108 (which may be remotely located on another computer) and memory 118. In the preferred embodiment, the communications interface 104 is able to handle overlapping communication requests. The memory 118 includes:

a multitasking operating system 120;

an Internet access procedure 122 for fetching web pages as well as communicating with the domain name system 114;

a multiplexer (mux) procedure 124 used by threads 130 for dequeuing URL's from the queues 128;

a demultiplexer (demux) procedure 126 used by the threads for enqueuing URL's on the queues 128;

a set of queues 128, also called the "Frontier," for storing addresses of web pages to be downloaded;

threads 130 for downloading web pages from the servers 112, and processing the downloaded web pages;

a host-to-queue assignment table 132 for recording dynamic assignments of host identifiers to the queues 128;

a heap or other ordered set data structure 134 for storing information about queues waiting to be serviced by threads;

a set of heap procedures 136 for adding a queue to, and for selecting a queue from the ordered set data structure 134;

a set of Queue Element handling procedures 138 for adding and deleting records of information to queue elements, and for adding and deleting name/value pairs to those records of information;

one or more URL priority determination procedures 140 for assigning a priority level to a queue element associated with a URL; and one or more document processing applications 141, which process documents downloaded by the web crawler.

The document processing applications include instructions 139 for determining the value of various parameters (e.g., metadata sent by the host server from which the documents were downloaded) and storing corresponding name/value pairs in the download history portion of the queue elements corresponding to the downloaded documents.

In the third exemplary embodiment, discussed below, the host-to-queue assignment table 132 is used and updated by the demux and mux procedures 126, 124. In the first and second exemplary embodiments the assignment table 132 is not used.

In some of the exemplary embodiments the number of queues exceeds the number of threads, and in those embodiments the number of queues is preferably at least twice the number of threads; in some embodiments the number of queues exceeds the number of threads by a factor of three to ten. The number of threads is generally determined by the computational resources of the web crawler, while the number of queues is determined by setting a queue-to-thread ratio parameter when the web crawler is configured.

Given a set of URL's, the web crawler 102 enqueues the URL's into appropriate queues 128. Multiple threads 130 are used to dequeue URL's out of the queues 128, to download the corresponding documents or web pages from the world wide web and to extract any new URL's from the downloaded documents. Any new URL's are enqueued into the queues 128. This process repeats indefinitely or until a predetermined stop condition occurs, such as when all URL's in the queues have been processed and thus all the queues are empty. In continuous web crawler embodiments, there is no such stop condition. Multiple threads 130 are used to simultaneously enqueue and dequeue URL's from multiple queues 128. During the described process, the operating system 120 executes an Internet access procedure 122 to access hosts on the network through the communications interface 104.

Figure 2:
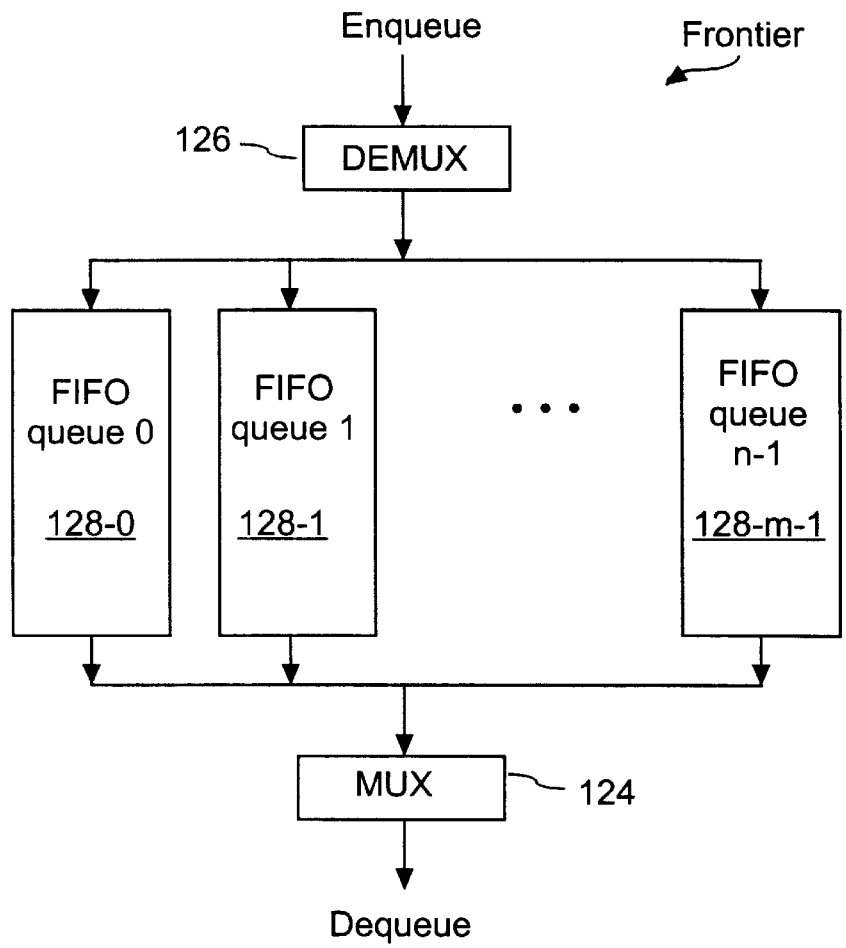
FIG. 2 is a block diagram illustrating an first exemplary embodiment of the invention.

FIG. 2 illustrates the relationships between a set of "m" first-in-first-out (FIFO) queues 128 and the demux and mux procedures 126, 124 in a first exemplary embodiment of the present invention. When a new URL is discovered, the new URL is passed to the demux 126. The demux 126 enqueues the new URL into an appropriate queue based on a predetermined policy. In the preferred embodiments, URL's having the same associated host component will be enqueued into the same queue. However, other URL to queue assignment policies could also be used. When a thread 130 is ready to dequeue from one of the queues 128, the head URL in the queue assigned to that thread is dequeued from that queue by the mux 124 and is passed to the thread for processing.

Queue Elements with Extensible Set of Download History Data

Figure 3:
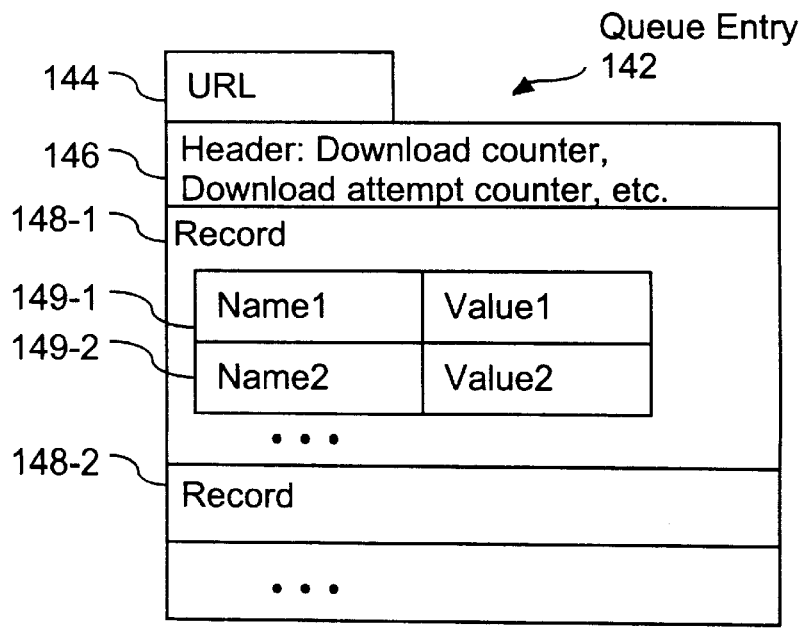
FIG. 3 is a block diagram of a queue element stored in the Frontier data structures of the first exemplary embodiment.

FIG. 3 illustrates a queue element data structure 142, also called the URL entry data structure, which is the data structure used to represent each URL in the Frontier, represented in this embodiment by queues 128. Each queue element 142 includes a URL value 144, and a list (i.e., an ordered set) of information records 148. Each record 148 includes one or more name/value pairs 149 for a particular download of the document corresponding to the URL 144, where the names identify parameters and the values are the corresponding values for those parameters. In addition to the records 148, the queue element 142 may also include a header 146 for retaining cumulative download history information, such as a count of the number of downloads of the corresponding document by the web crawler, a count of the number of download attempts, and the like. This information could also be kept in the records, with increasing count values being stored in successive records 148. The list of records associated with a URL together comprise the URL's download history.

The set of queue element handling procedures 138 that can be used by the web crawler, and more particularly by document processing applications 141 which process the pages downloaded by the web crawler, include but are not limited to the following:

Size( ) returns the number of records in the list, for the currently selected queue element;

Get(i) returns the record at position i in the list;

Delete(i) removes the record at position i from the list; compacting the list accordingly;

Add(record) inserts the given record at the front of the list; as well as procedures that operate on a particular record, including:

Lookup(name) returns the value from the name/value pair, if a matching pair is found;

Set(name, value) adds a name/value pair to the record consisting of the given name and given value, and replaces any previous pair with the identical name;

Delete(name) removes the name/value pair with the given name from the record, if a matching pair is found; and Enumerate( ) returns a list of the name/value pairs in the record.

As will be described in more detail below, when a queue element is removed from the Frontier, a new empty record is added to its download history, representing the imminent download attempt. The document identified by the queue element's URL is downloaded and processed. During the course of processing a document, all records of the corresponding queue element's download history may be inspected, and name/value pairs may be set in the element's newly added record.

In the case of a continuous crawl, the queue element is reinserted into the Frontier. Before the queue element is reinserted, one or more of its records may be removed. If no records are removed, the document's complete download history is kept. Other alternatives include, but are not limited to: keeping the "p" most recent records; keeping a uniform sample of records (e.g., for every third download); keeping a random sample of records (e.g., each record might be kept with a probability of 0.25); or keeping the records corresponding to the initial download and the last "p" downloads.

Independent of whether continuous crawling is used, once the processing of a document is complete, the document's queue element may be written to a file for subsequent off-line analysis.

Enqueue and Dequeue Procedures

In the exemplary embodiments, and in most web crawlers, the web crawler begins its crawls with an initial set of root documents. The root documents are selected so that all documents of interest in the Intranet or Internet being crawled can be reached from the URL links in the initial set of root documents and in the subsequent documents accessed via those URL links. This initial set of root documents may be preloaded into the queues 128 of the web crawler's Frontier.

Figure 4:
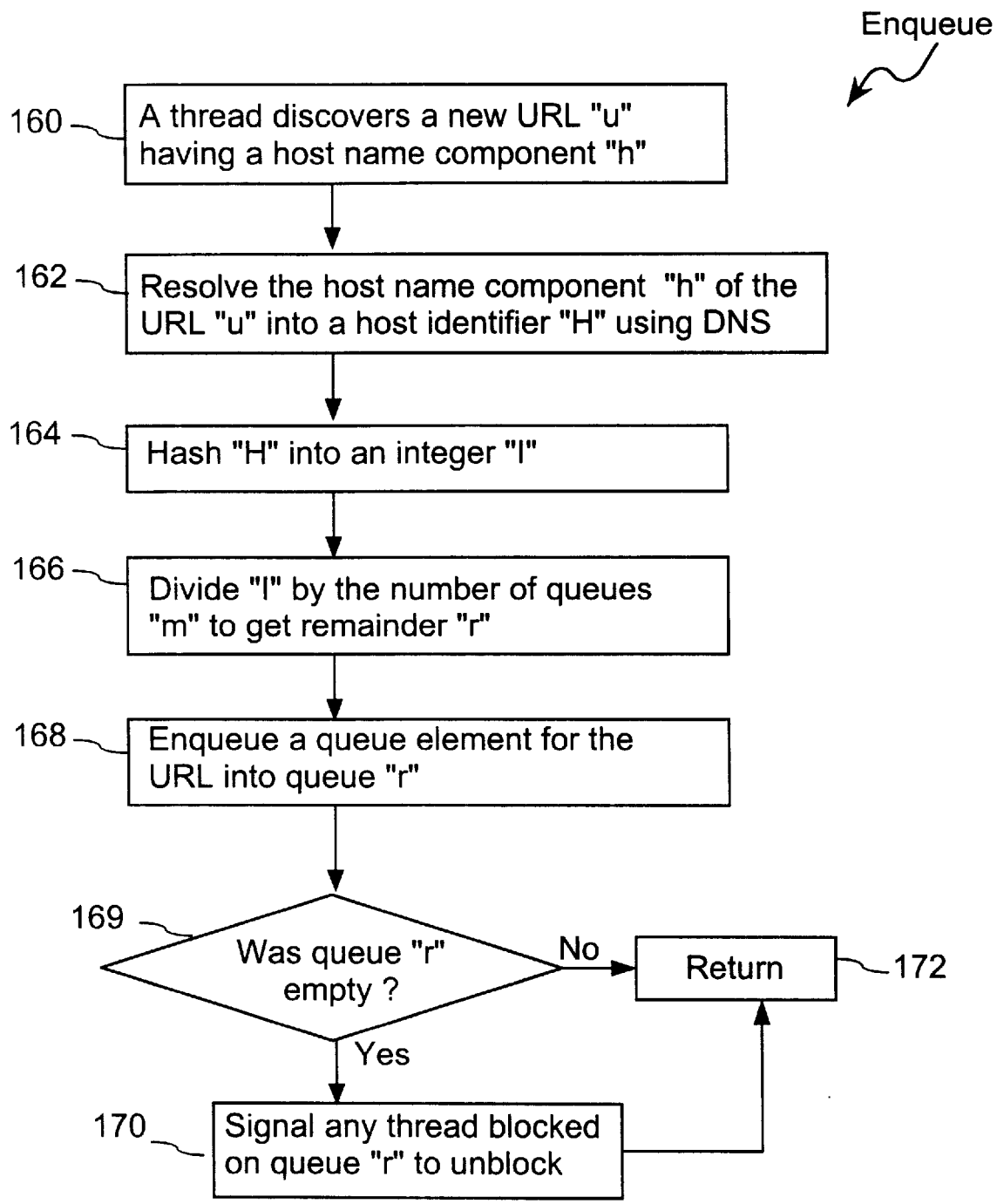
FIGS. 4 and 5 are flow charts depicting the first exemplary embodiment of the invention.

FIG. 4 is a flow chart illustrating the process, in the first exemplary embodiment of the present invention, for enqueuing URL's into a set of "m" queues using a set of "k" threads. To simplify the explanation of the web crawler's basic operation, and how the queue element download history is generated and used, we will assume that the number of queues "m" is equal to the number of threads "k." In other embodiments, however, "m" may be larger than k.

When a thread of the web crawler downloads a page or document, it inspects each URL in the downloaded page. The thread then determines if the web crawler should enqueue each discovered URL for downloading. For instance, the thread may query a database to determine whether that URL has been visited during the current crawl, and then enqueue the URL only if the response to that inquiry is negative and if the URL passes a user-supplied filter. The enqueue procedure described below is performed once for each URL that the thread has decided to enqueue.

In this exemplary process, queues are identified by numerical ID's. For example, when a thread invokes the "dequeue" operation for a selected queue "i," the first item of the queue "i" is dequeued and returned.

The enqueue operation, performed by a thread executing the demux procedure 126, works as follows in the first exemplary embodiment. A thread discovers a new URL "u" having a host name component "h" during the course of downloading web pages (160). The host name component "h" of the URL "u" is resolved into a host identifier "H" using the domain name system 114 (162). The resolved host identifier is preferably a canonical name or a canonical IP address for the host. Step 162 maps all the host names associated with an Internet or Intranet host to the same host identifier. Without step 162, the URL's associated with a single host might be assigned to multiple queues. That could cause the web crawler to submit multiple overlapping download requests to the host, which would violate the "politeness" policy observed in the preferred embodiments.

The host identifier "H" of the new URL "u" is mapped into a queue identifier "r" using a suitable numerical function. For example, in one preferred implementation a fingerprint function is used to hash the host identifier "H" into an integer "I" (164). The integer "I" is divided by the number of queues in the system, such as "m", to get a remainder "r" between 0 and m−1 (166). In other words, r is set equal to the fingerprint of H modulo m. Examples of other possible numerical functions that could be used to map the host identifier into a queue identifier are checksum and hash functions.

Having selected queue "r," a queue element for the new URL "u" is enqueued into queue "r" (168). If queue "r" was empty immediately before the new URL "u" was enqueued on it, (169-Yes), then the system signals any thread blocked on queue "r" to unblock (step 170) and returns (172). If queue "r" was not empty (169-No), the procedure simply returns (172).

Figure 5:
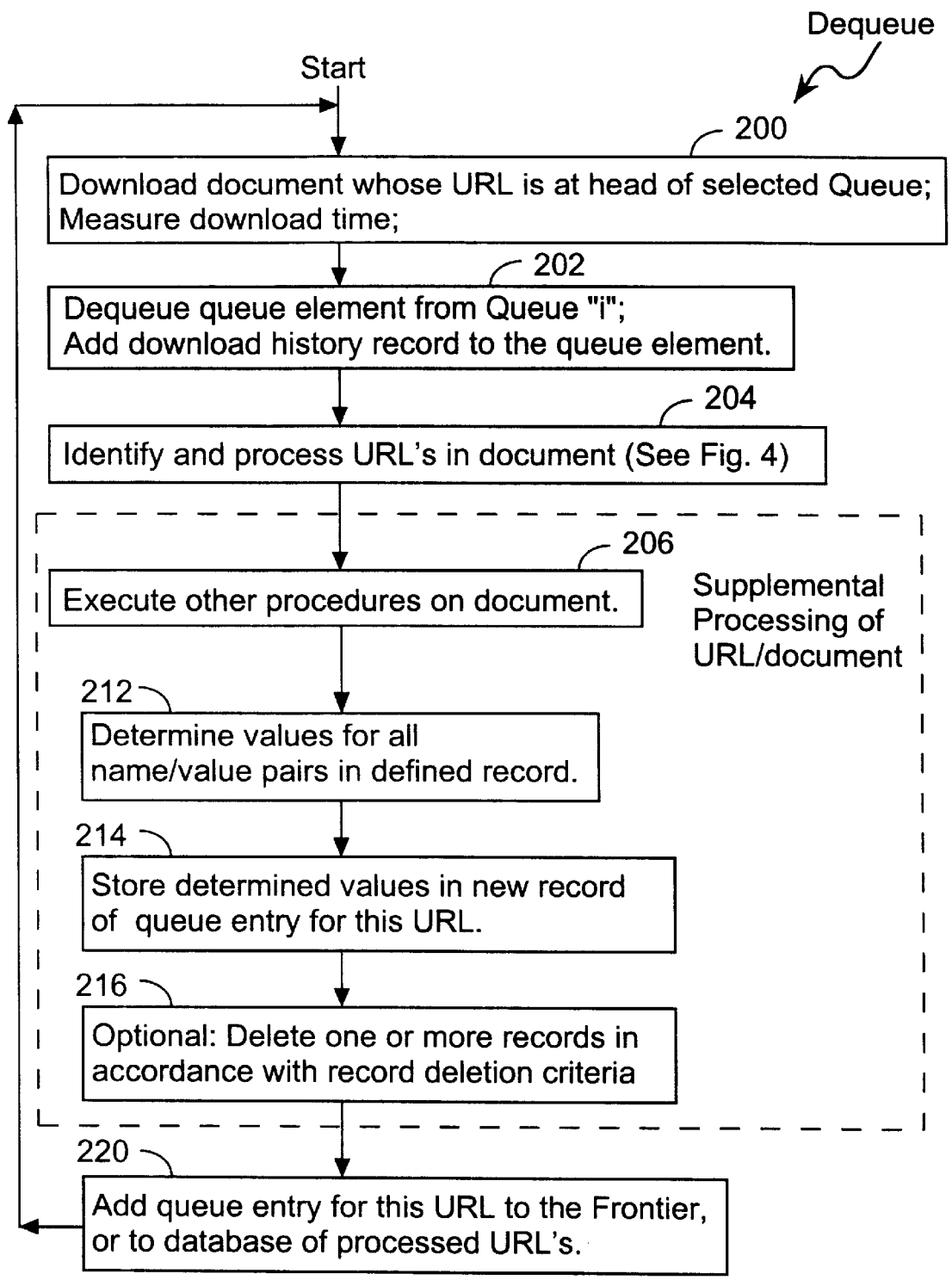

Referring to FIG. 5, each thread of the web crawler selects one of the queues in the ordered set. In this first exemplary embodiment, each thread services just one queue, but in other embodiments there would be a preliminary set of steps by which the thread would first be assigned to a queue that is waiting to be serviced. The thread then downloads the page or document corresponding to a queue element in the queue, dequeues the queue element from the queue, processes the page, and then repeats the process. This continues until the web crawl completes, or without stop in the case of a continuous web crawler.

More specifically, the dequeue procedure, when executed by any of the web crawler threads, downloads the document corresponding to the queue element at the head of the queue assigned to (or selected by) the thread, and measures the download time (200). Then it dequeues the queue element from the selected queue and adds a new, empty download history record to the queue element (see FIG. 3) (202). The downloaded document is typically processed by the web crawler by identifying and processing the URL's in the document (204), as well as by executing other procedures on the downloaded document (206). In the preferred embodiment, the set of other procedures executed on the downloaded document is configurable by the person setting up the web crawler.

Steps 212, 214, 216 are typically performed by the document processing applications, but could be incorporated into the dequeue procedure by making procedure calls to a set of procedures that would be provided by the person setting up the web crawler. The name/value pairs to be stored in the current (new) download history record are determined (212) and stored in that record (214). Optionally, one or more download history records may be removed from the queue element in accordance with record deletion criteria established by the applications (216). Examples of the record deletion criteria include criteria for retaining only the last "p" records, or the first record and the last "p" records. To implement such record deletion, an application program includes instructions for determining the number of records in a queue element by calling the Size( ) procedure, instructions for comparing the returned number with a threshold value, and instructions for conditionally deleting specific ones of the records based on the result of the comparison.

When the processing of the downloaded document and the queue element is completed, the queue element is either reinserted into the Frontier (thereby enabling continuous crawling), added to a file or database of processed URL's (from where the download history information can be processed off-line), or both (220).

Prioritizing Document Downloads

Figure 6:
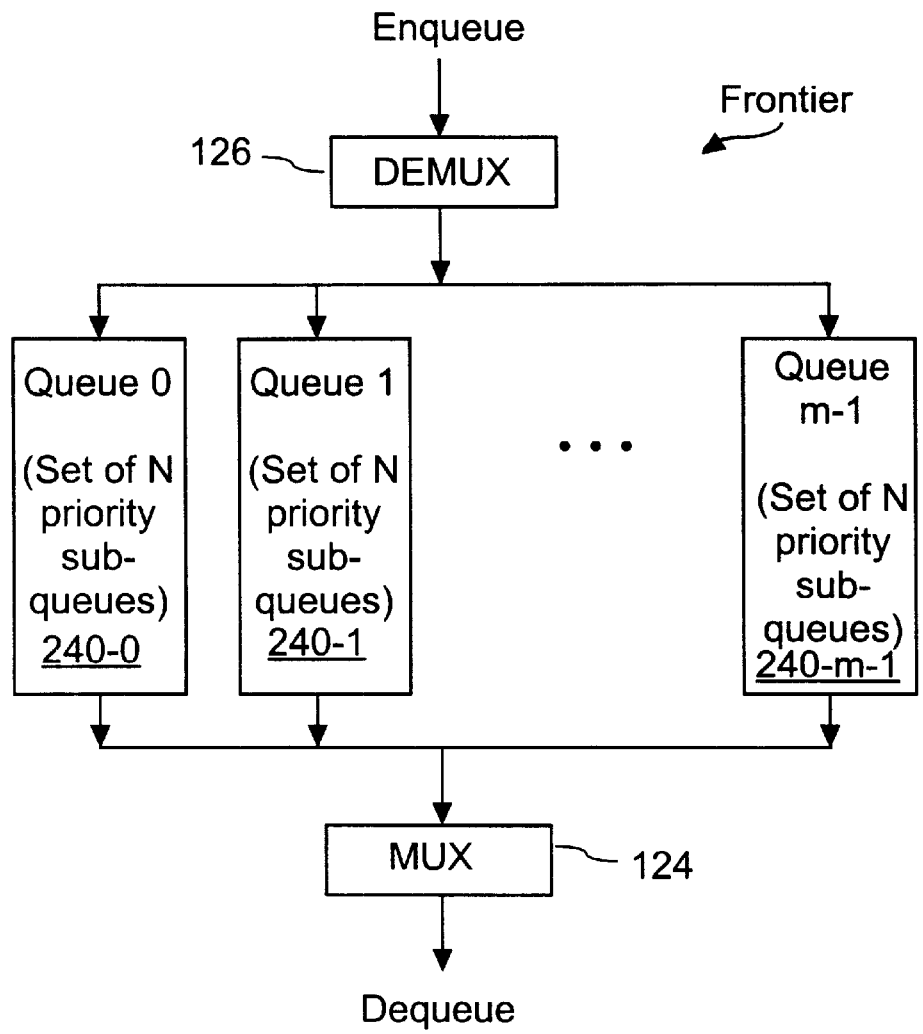
FIGS. 6 and 7 are block diagrams illustrating the Frontier data structures used in a second exemplary embodiment of the invention.
Figure 7:
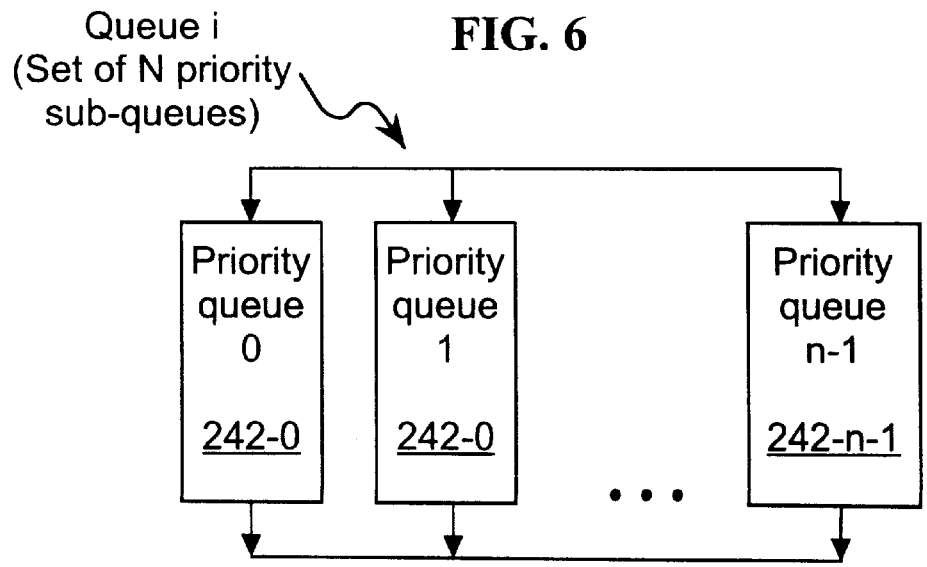

Referring to FIGS. 6 and 7, in a second exemplary embodiment, each of the m queues 240 in the Frontier is replaced by a set of n subqueues 242, herein called priority subqueues or priority level subqueues. Furthermore, a priority level is assigned or associated with each of the priority queues. For example, a set of six priority queues 242 could be assigned priority "weights" as shown in Table 1.

TABLE 1

| Priority Level | Priority Weight |
|---|---|
| 1 | 32 |
| 2 | 16 |
| 3 | 8 |
| 4 | 4 |
| 5 | 2 |
| 6 | 1 | where each priority weight is proportional to the probability of a queue element in one of the priority queues being selected for processing. In this scheme, queue elements in priority level 1 queue are thirty-two times more likely to be processed than queue elements in the priority level 6 queue. Of course, the number of priority queues, and the weights assigned to them can be arbitrarily determined, or determined in accordance with any of a large number of schemes.

Figures 8A, 8B:
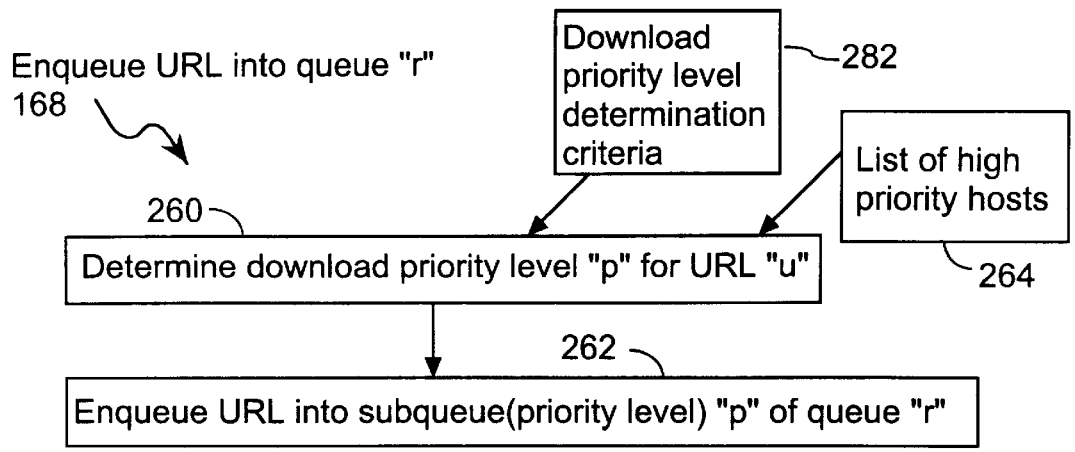
FIGS. 8A and 8B are flow charts depicting the second exemplary embodiment of the invention.

The enqueue and dequeue procedures for this second exemplary embodiment are very similar to the ones described above with reference to FIGS. 4 and 5, with the following differences. Referring to FIG. 8A, in the enqueue procedure of FIG. 4, the enqueuing step 168 includes determining a priority level for downloading the document associated with the URL "u" (260) and then enqueuing the associated queue element into the priority subqueue of queue "r" for the determined priority level (262). Note that queue "r" now represents the set of priority subqueues for queue entries whose URL has a host identifier that was mapped to queue "r".

At step 260, the priority level "p" for the URL "u" is determined as a function of the URL itself, since the URL is for a document that has not yet been downloaded by the web crawler. In the preferred embodiment, the queue entries for newly found URL's are given higher priority than the queue entries for URL's whose corresponding documents have already been downloaded and processed. In addition, the web crawler may reference a list of "high priority" hosts 264 whose documents are to be given higher downloading priority than other hosts. In addition, the web crawler may give higher priority to new URL's whose host is not found on the list 264 that meet predefined criteria for being "short". For instance, short URL's may be ones whose character string is less than a certain number of letter, or whose tree structure contains less than a certain number of tree levels. The latter example prefers pages near the root node of each host to those further away from the root node.

Referring to FIGS. 5 and 8B, step 200 for downloading the URL at the head of the selected queue "r" is replaced by the steps shown in FIG. 8B. In particular, the dequeue procedure selects a priority level subqueue by generating a random number, z, and then mapping z to one of the priority level subqueues using a non-uniform mapping that is weighted in accordance with the weights assigned to the priority levels. For instance, using the priority level weights shown in Table 1, the priority level 1 subqueue has thirty-two times the likelihood of being selected than the priority level 6 subqueue. Table 2 shows an exemplary non-linear mapping of z to a priority level, where z is a random or pseudo-random value between 0 and 1.

TABLE 2

Mapping a Random Value z to a Priority Level

| Priority Level | Range of z For Priority Level | | |
|---|---|---|---|
| 1 | 0.0 | to | 0.5079 |
| 2 | 0.5080 | to | 0.7619 |
| 3 | 0.7620 | to | 0.8888 |
| 4 | 0.8889 | to | 0.9524 |
| 5 | 0.9525 | to | 0.9841 |
| 6 | 0.9842 | to | 1.0000 |

Next, the dequeue procedure checks to see if the selected priority level subqueue "p" is empty (272). If so, it also checks to see if all the priority level subqueues of queue "r" are empty (274). If all are empty, this means that subqueue "r" is empty, in which case the thread blocks until the selected queue is no longer empty (276). In embodiments where there are many more queues than threads, step 274 is not needed because a thread will not be assigned to an empty queue.

If the selected priority level subqueue is empty (272-Yes) but there is at least one non-empty subqueue (274-No), then a subqueue closest to the selected subqueue is selected (278).

Once a non-empty priority level subqueue has been selected, the document corresponding to the URL at the head of the selected subqueue is downloaded, and then the dequeue procedure continues from there at step 200 as shown in FIG. 5. When the document is downloaded, the host web server from which the document is downloaded returns both the document and associated metadata, which typically includes, but is not limited to, the HTTP status code, the date and time the document was last modified, the document's purported expiration date and time, document length, the character set used by the document, and identification of the web server from which the document was downloaded.

In this exemplary embodiment, the supplemental processing steps 206–216 include storing attributes for each document download that include, but are not limited to:

- the date and time of the download;
- the date and time the document was last modified, according to the host server;
- the document's expiration date and time, according to the host server;
- a checksum of the document's contents; and
- a "sketch" of the document's contents.

A sketch of a document is a small number (e.g., eight) of values, generated by converting a document into a set of symbols (e.g., fingerprints of four word sequences), performing a set of permutations on the symbols, selecting a subset of the symbols (e.g., the lowest values) from each permutation, and possibly performing various combinations or other mathematical operations on the selected symbols to form the values in the sketch. An important property of the sketch is that when a document has been modified, but only minimally, at least a certain number of the values of the document's sketch will remain unchanged, but when the document is modified by more than a minimal amount (e.g., by more than 5% or so) less than a threshold number of values in the sketch will remain unchanged. The document sketch therefore gives a good basis for determining when a document has changed "enough" for the supplemental applications to treat it as a modified document. For more information about document sketches, see U.S. Pat. No. 5,909,677, which is hereby incorporated by reference as background information.

In this exemplary embodiment, step 220 (FIG. 5) of the dequeue procedure includes selecting a priority level subqueue in which to re-insert the queue element for the document that has just been downloaded and processed. In this exemplary embodiment, the document is assigned to a priority level subqueue based on a predefined set of criteria 282 are satisfied, including but not limited to:

- the document's expiration date; the sooner the document's expiration date, the higher its assigned priority level;
- the document's rate of change, based on (a) its modification date and time (according to the host server), (b) whether the document's checksum differs from the prior checksum, or (c) whether the document's sketch differs from the prior document sketch by more than a predefined amount; documents that change more frequently should be assigned to a higher priority level subqueue, on the basis that pages that exhibit changes are likely to change again in the near future; and
- the host component of the document's URL; for example, documents from certain web sites known to the web crawler may be assigned a high or low download priority based on knowledge of how often documents at those web sites are updated.

Many other examples of criteria 282 for assigning a priority level to a document's queue element can be devised by one of ordinary skill in the art, depending in large part on what information is stored in the document's download history and an assessment of which documents are the most important to refresh the most frequently. Furthermore, different download priority criteria may be applied to different subsets of the queue elements. For example, one set of criteria may be used for queue elements having no download history, a second set of criteria may be used for queue elements denoting URL's at web sites known to the web crawler, a third set of criteria may be used for queue elements whose expiration date and time is deemed to be "soon" (e.g., less than X hours from the current time), and yet other sets of criteria may be used for other queue elements identified in various ways.

The present invention enables the criteria 282 for prioritizing document downloads in a continuous web crawler to be determined by applications external to the web crawler.

Polite Continuous Web Crawling

FIGS. 9–16 show a third exemplary embodiment for a continuous web crawler having priority level subqueues that are used to maintain the freshness of document indices and other document based information databases. The third exemplary embodiment uses a Frontier data structure and a dynamic assignment of threads to queues that is more "polite" than the ones described above. In particular, in this embodiment, the web crawler enforces a "politeness" policy, which requires the web crawler to wait between document downloads from any given host for a sufficient period so that there are no document downloads being performed from that host for at least a specified percentage (e.g., 50%) of the time. In all the exemplary embodiments, the web crawler never downloads more than one document at a time from any host.

In this third embodiment, the Frontier data structures 290 include a front-end queue 292, which is implemented as a set of n priority level FIFO subqueues 294, and m FIFO "underlying" queues (also called the back-end queues) 296, where m is preferably larger than the number of threads. A first demultiplexer (demux) procedure 298 is used to store queue elements in the front-end queue 292, while a second demultiplexer (demux) procedure 300 is used to store queue elements in the underlying FIFO queues 296. Similarly, a first multiplexer (mux) procedure 302 is used to select and remove queue elements from the front-end queue 292 (for insertion into the underlying queues 296), while a second multiplexer (mux) procedure 304 is used to select and remove queue elements from the underlying FIFO queues 296. Mux 302 and demux 300 are used only for moving queue elements from the priority subqueues 294 into the underlying queues 296.

When a new URL is discovered, it is typically enqueued in the front-end queue 292. However, if the front-end queue 292 is empty, the new URL is not necessarily stored in the front-end queue 292; instead, it may be enqueued in one of the queues 296 by the demux 298/300. The demux 298/300 dynamically enqueues the new URL in an appropriate queue 296 according to a host-to-queue assignment table 132, based on the host identifier of the new URL. The host-to-queue assignment table 132 is used to guarantee that each queue is homogenous, i.e., that each queue contains URL's having the same host name component. When a thread is ready to dequeue a queue element from a queue 296 the head queue element in a queue assigned to the thread passes through the mux 304 and is dequeued from the queue. The corresponding document (e.g., web page) of the dequeued queue element is downloaded and processed.

Figure 9:
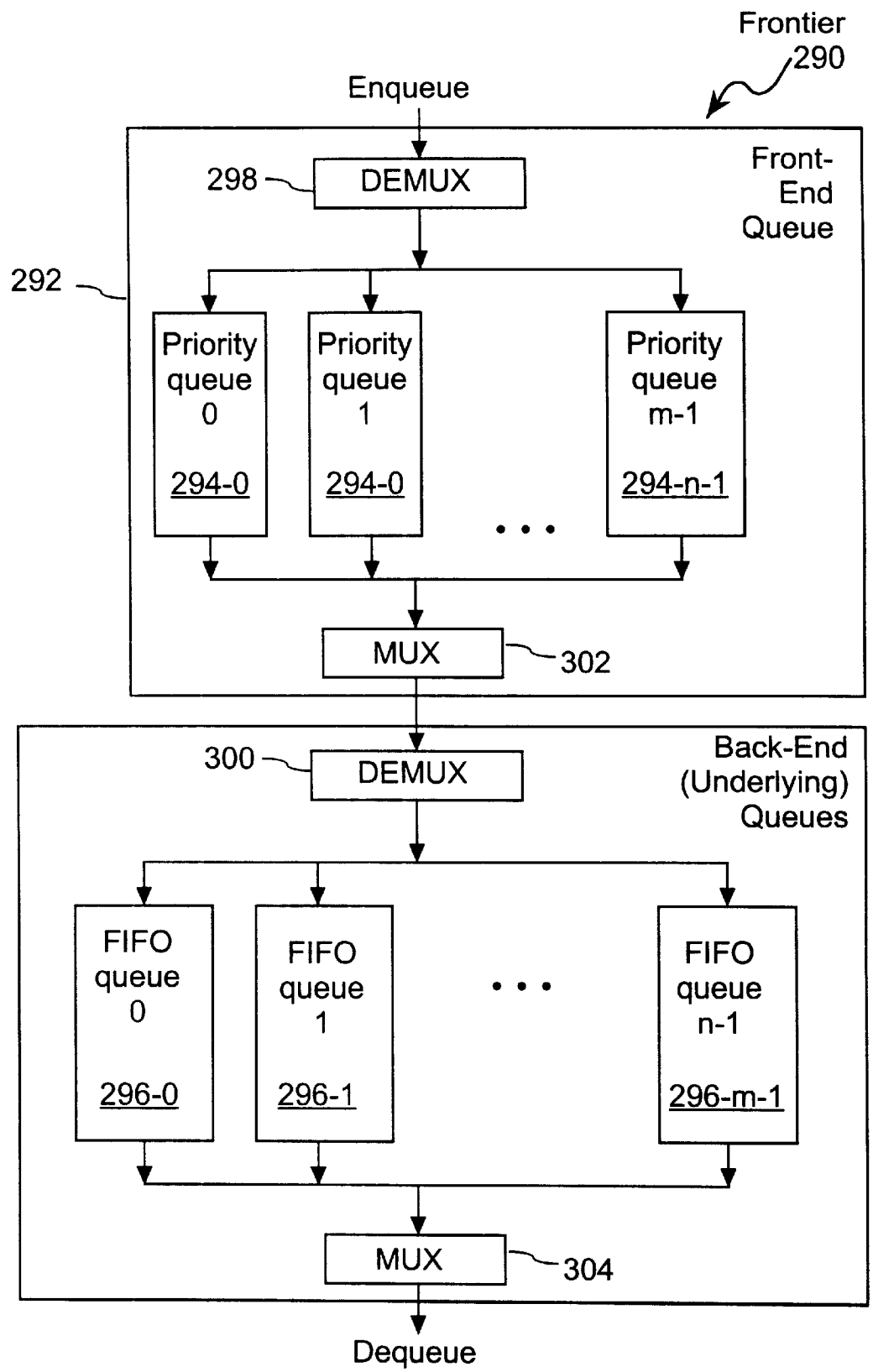
FIG. 9 is block diagram illustrating the Frontier data structures used in a third exemplary embodiment of the invention.
Figures 10, 11:
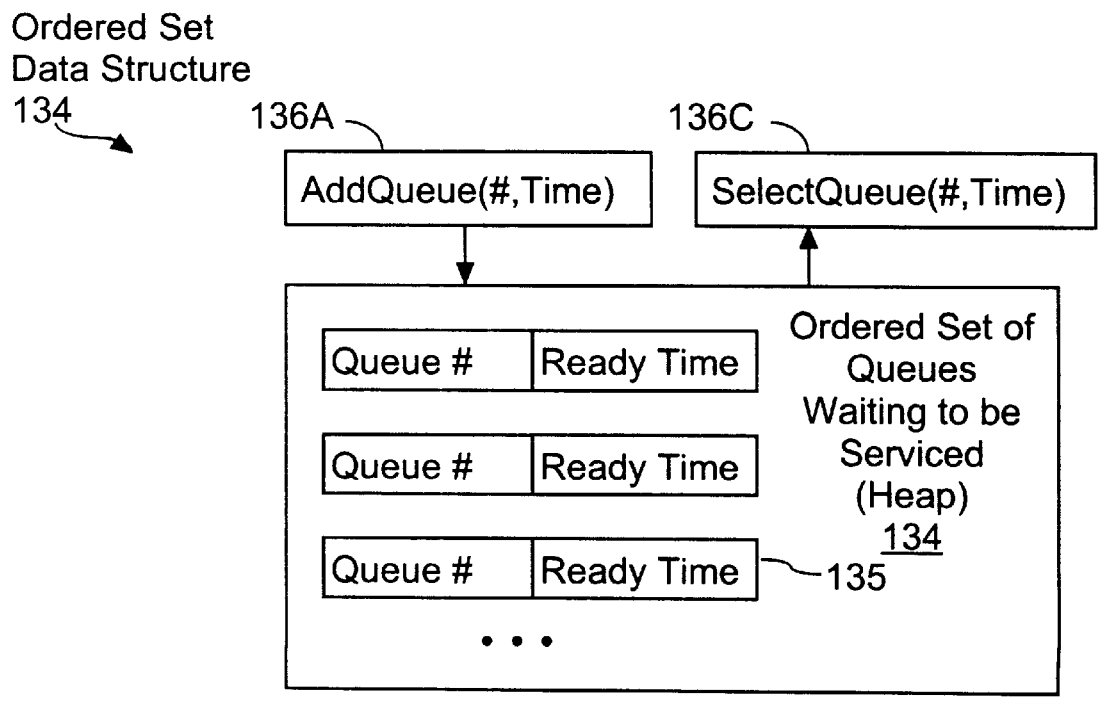
FIG. 10 illustrates a table used in the third exemplary embodiment.
FIG. 11 is a block diagram of an ordered set data structure and procedures used to access the ordered set in the third exemplary embodiment of the invention.

FIG. 10 illustrates an exemplary embodiment of the host-to-queue assignment table 132. The host-to-queue assignment table 132 is updated when a host identifier 308 is dynamically assigned to a queue 296 (represented by a queue identifier 309) or when the association of a host identifier 308 with a queue 296 is removed. Each queue 296 (FIG. 9) may be dynamically reassigned to a new host identifier after all URL's in the queue have been processed.

FIG. 11 illustrates an "ordered set data structure" 134 for keeping track of the queues 296 that are waiting to be serviced by threads. The data structure 134 stores an entry 135 for each queue that is waiting to be serviced. The entry 135 has a plurality of fields, including one for identifying the queue, and another for indicating the queue's assigned next download time.

Although not shown, the data structure 134 has internal structure for ordering the entries 135 in accordance with the assigned next download times of the entries. A number of well known data structures can be used for this purpose, including a heap, a balanced tree, or even a simple linked list (suitable only if the number of queues being used is very small, e.g., less than twenty). The ordered set data structure is indirectly accessed by the enqueue and dequeue procedures through a set of interface procedures 136A, 136B. In particular, an AddQueue procedure 136A is used to add a queue to the ordered set. A SelectQueue procedure 136B is used to select and remove from the ordered set a queue whose assigned next download time is no later than any other queue in the ordered set. If multiple queues have identical earliest assigned next download times, the SelectQueue procedure selects any one of those queues, removes it from the ordered set, and passes it to the calling thread.

Figure 12:
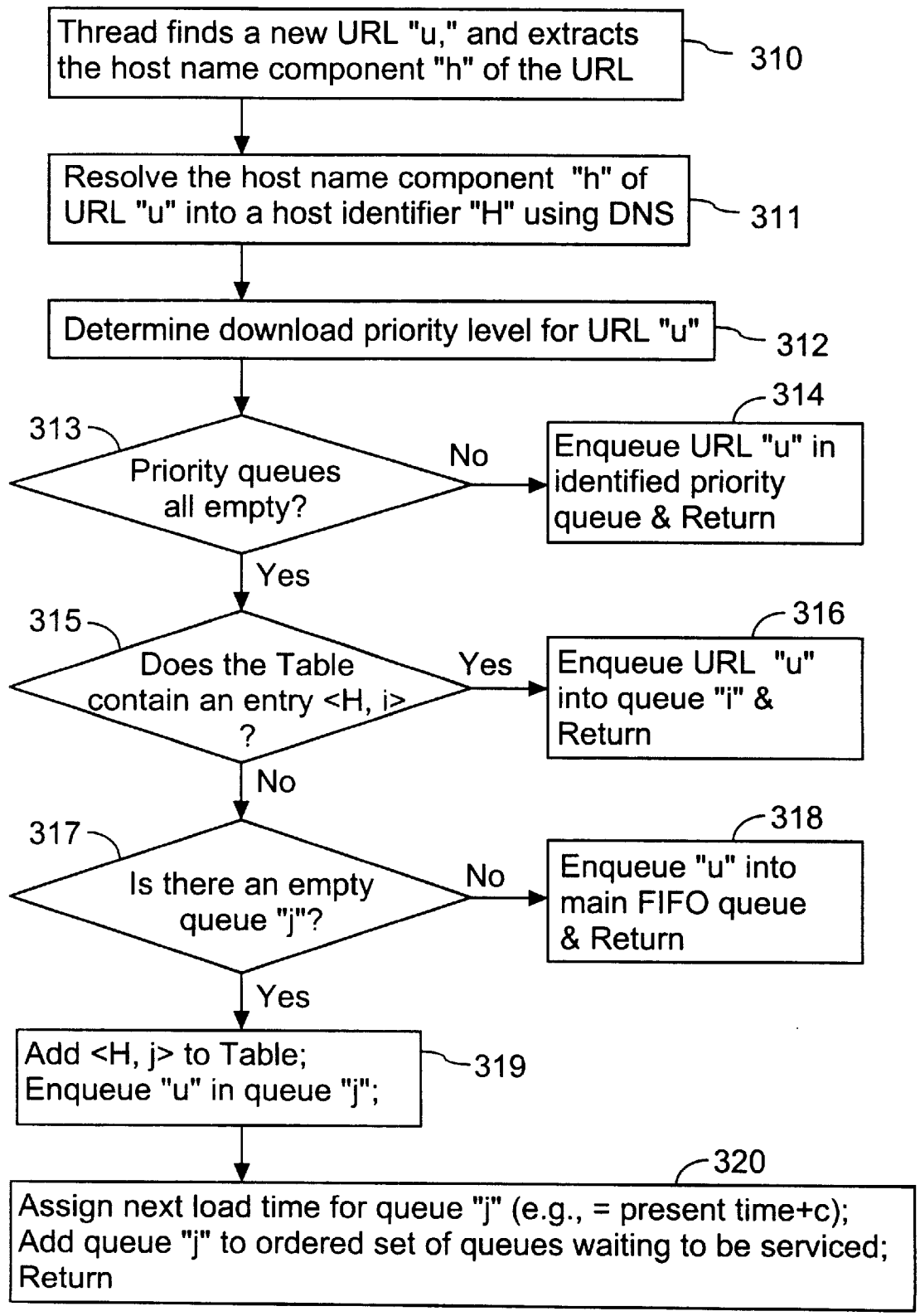
FIGS. 12, 13, 14, 15 and 16 are flow charts depicting the third exemplary embodiment of the invention.

FIGS. 12–16 are flow charts of the third exemplary embodiment of the present invention. In particular, the flow chart in FIG. 12 illustrates the enqueue operation, corresponding to the demux procedures 298, 300 shown in FIG. 9, which are used by each of the threads to store queue elements for new URL's discovered while processing downloaded web pages, as well as to reinsert the queue elements.

Referring to FIG. 12, while processing a downloaded web page, a thread will determine whether the URL in each link in the page is a known URL, which has already been enqueued and/or processed by the web crawler, or a new URL, which has not yet been enqueued or processed by the web crawler. When a thread discovers a new URL "u," it extracts the host name component "h" from the URL (310). The host name component "h" of the URL "u" is resolved into a host identifier "H" using the domain name system 114 (311). The thread then determines whether the front-end queue 292 is empty (313). The front-end queue 292 is empty only if all the priority level subqueues 294 are empty. If the front-end queue 292 is not empty, a queue element for URL "u" is enqueued into the front-end queue 292 (314) and then the enqueue procedure exits.

The procedure for enqueuing the queue element for URL "u" into the front-end 292 is the same as the procedure shown in FIG. 8A. In particular, the enqueue procedure determines a priority level for downloading the document associated with the URL "u" (260) and then enqueues the associated queue element into the priority subqueue of the front-end queue for the determined priority level (262).

The process for moving URL's from the front-end queue 292 into the underlying queues is described later.

If all the priority level subqueues 294 of the front-end queue 292 are empty (313-Yes), the thread searches the table 132 for an entry assigning "H" to any of the queues (315). If such an entry is found, the new URL "u" is enqueued into the queue "i" 296-i to which host identifier "H" is assigned, and the thread returns (316). If such an entry does not exist, the thread searches for an empty queue "j" 296-j (317). If there is no empty queue, the URL "u" is enqueued into the front-end queue 292 and the thread returns (318). If an empty queue "j" is found, "H" is assigned to queue "j", table 132 is updated with the new assignment, and the URL "u" is enqueued into the queue "j" (319). In addition, the queue "j" is assigned a next download time and is added to the ordered set of queues waiting to be serviced (320), and then the thread returns. Since the last time that the web crawler performed a download from the host H is unknown, the next download time assigned to the queue is arbitrarily selected, for instance by adding a small constant to the current time. In this embodiment the small constant is selected to be equal to the average document download time for an "average" host web site. Other delay values could be used in other embodiment.

Figure 13:
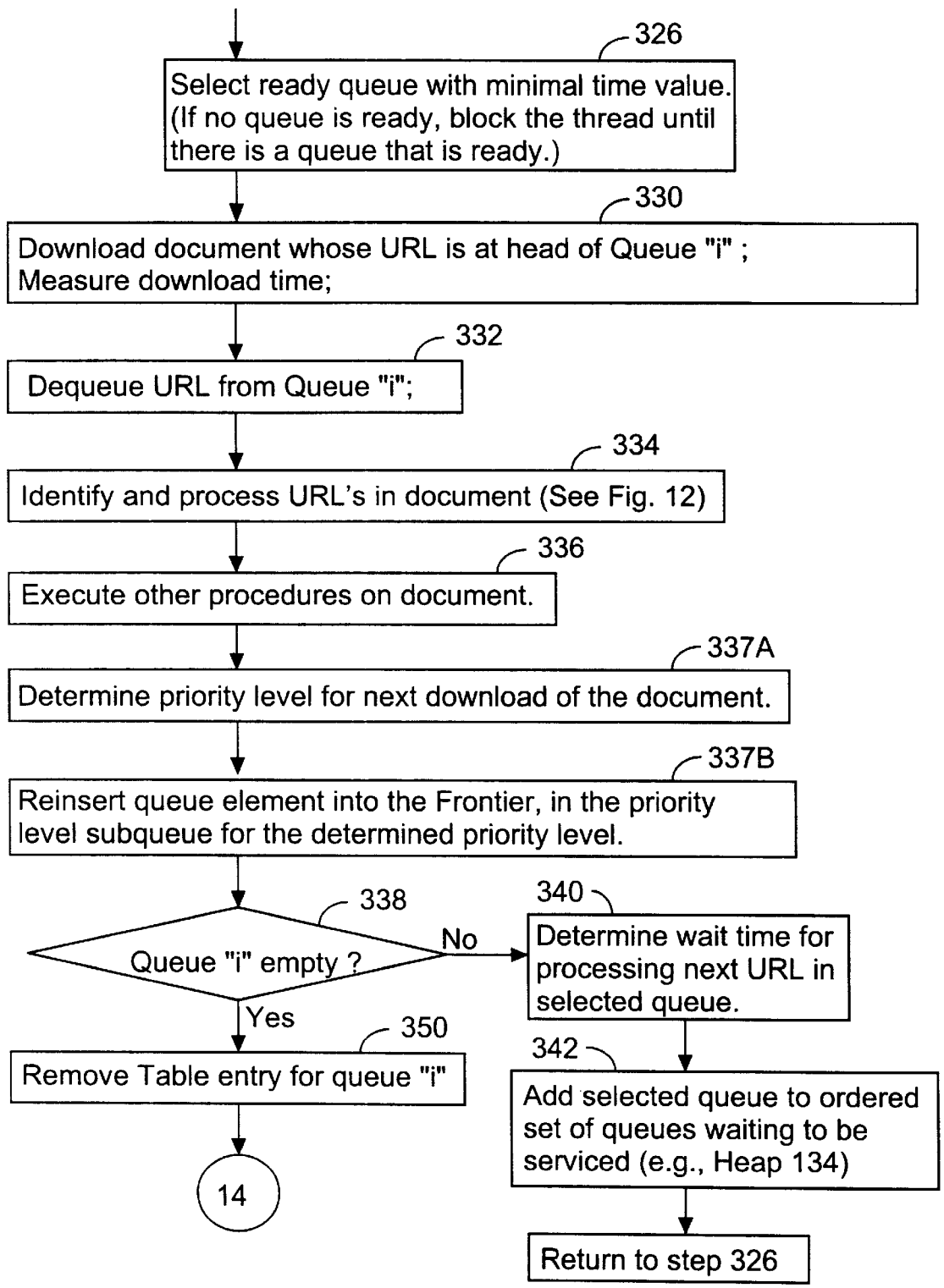
Figure 14:
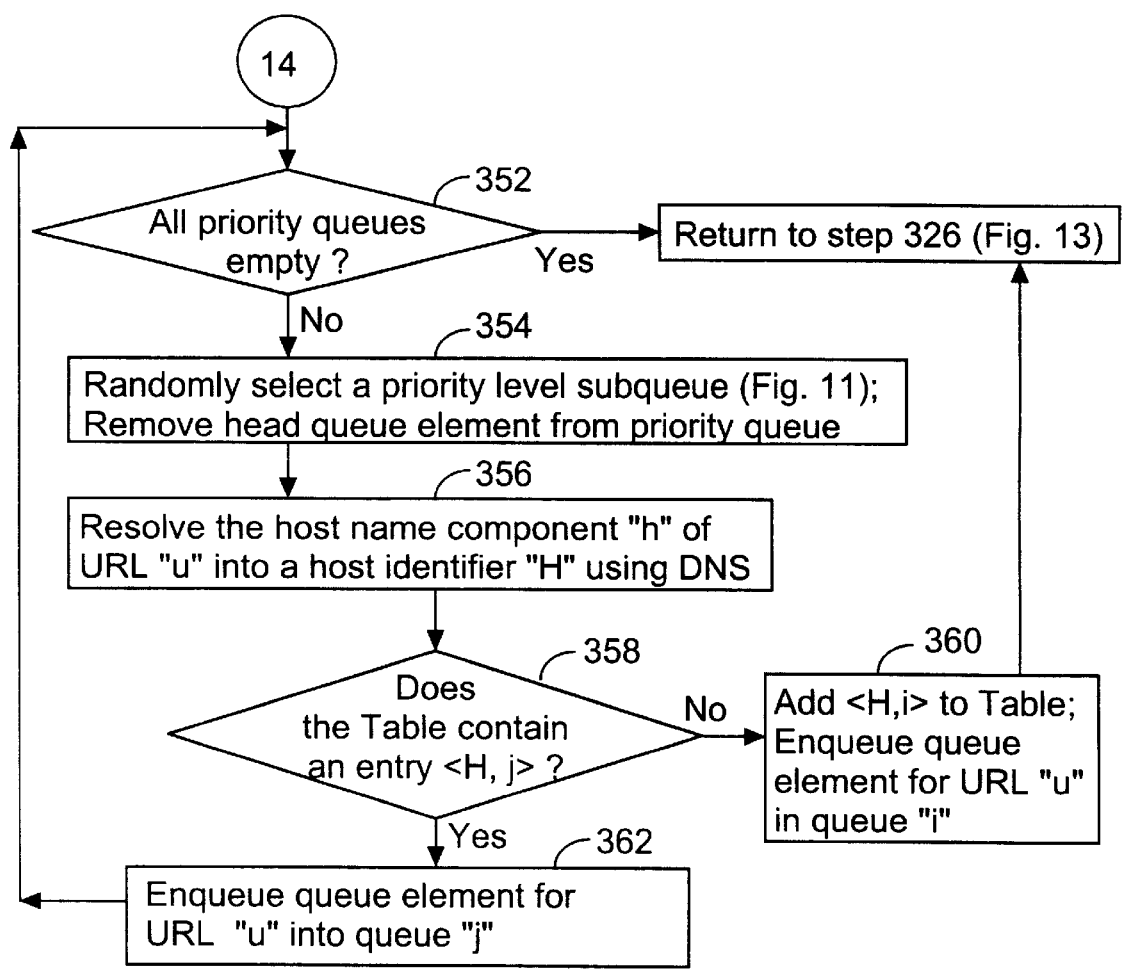

FIGS. 13, 14, 15 and 16 contain a flow chart of the dequeue procedure performed by each thread in the third exemplary embodiment to dequeue and process the queue elements in the FIFO queues 296 (FIG. 9). This procedure corresponds to the mux procedure of FIG. 9. As part of this procedure, the thread moves queue elements from the front-end queue 292 to the underlying queues 296 whenever the queue selected by the thread becomes empty, because all the queue elements in the assigned or selected queue have been processed and dequeued. The dequeue procedure shown in FIGS. 13 and 14 is performed repeatedly by each of the "n" threads of the web crawler. The enqueue procedure, discussed above and shown in FIG. 12, is performed while processing a downloaded web page.

Referring to FIGS. 13 and 14, each thread of the web crawler selects one of the queues in the ordered set that is waiting to be serviced, downloads the page or document corresponding to a URL in the selected queue, dequeues the URL from the selected thread, processes the page, and then repeats the process. This continues until the web crawl completes.

More specifically, the dequeue procedure, when executed by any of the web crawler threads, first selects a queue "i" having a minimal next download time value (326). This step is preferably accomplished by calling the SelectQueue procedure. If no queues are ready for processing, because their assigned next download times are all in the future, the thread executing the dequeue procedure blocks until there is a queue that is ready for processing.

As indicated above, if multiple queues have identical earliest assigned next download times, the SelectQueue procedure selects any one of those queues, removes it from the ordered set, and passes it to the calling thread. After selecting a queue "i", the thread processes the URL at the head of the selected queue by downloading the corresponding document, measuring the download time (330), and dequeuing the URL from the selected queue (332).

The downloaded document is typically processed by the web crawler by identifying and processing the URL's in the document (334), as well as by executing other procedures (application programs external to the web crawler) on the downloaded document (336). In the preferred embodiment, the set of other procedures executed on the downloaded document is configurable by the person setting up the web crawler, and often includes a document indexer. As described above, these procedures may store various parameters in the download history of the queue element corresponding to the downloaded document.

After the document has been processed, and its download history has been updated by the external application programs in step 336, a priority level is determined for the next download of the document (338), using the same criteria as described above. Then the queue element for the document is reinserted into the Frontier, in the priority level subqueue 294 (FIG. 9) corresponding to the determined priority level.

If the selected queue is not empty (338-No) after the head queue element is dequeued, the thread determines a next download time for the queue (340). In a preferred embodiment, the next download time assigned to the selected queue at step 340 is:

next download time=current time+$\beta \cdot$(measured download time)

where $\beta$ is a predefined scaling constant. While $\beta$ may be set equal to 1, it can also be set equal to a larger number (e.g., 2) or smaller number (e.g., 0.5), depending on the politeness policy selected by the person configuring the web crawler. Once the next download time has been determined for the queue, the queue is added to the ordered set of queues (342) by calling the AddQueue procedure, which stores in the ordered set an entry for the queue that includes the assigned next download time. Then the thread resumes processing at step 326 (FIG. 13) to process the head URL in queue "i."

However, if the selected queue "i" is empty (338-Yes), the queue is not immediately returned to the ordered set. Rather, the table entry for queue "i" is removed, on the basis that an empty queue is available for reassignment to a new host. If all the priority level subqueues of the front-end queue are empty (352-Yes), the thread then resumes processing at step 326 (FIG. 313). Otherwise (i.e., the front-end is not empty, 352-No), the thread randomly selects a priority level subqueue, using the methodology discussed above, and removes the head queue element from that priority level subqueue (354). Then the thread resolves the host name "h" of the URL "u" of this queue element into a host identifier "H" using the domain name system 114 (356). If there is an entry in the host-to-queue assignment table 132 (FIG. 10) such that "H" is the assigned host identifier for a queue "j" (358-Yes), the queue element for URL "u" is enqueued into the queue "j" (362), any thread blocked on queue "j" is signaled that the queue is no longer empty, and the thread goes back to step 352 to process another queue element (if any) in the front-end. If there is not an entry in the table 132 that maps host identifier "H" to a queue "j" (358-No), "H" is assigned to queue "i" (360). In particular, the table 132 is updated with the new assignment and the queue element for URL "u" is enqueued into queue "i" (360). The thread then returns to step 326 (FIG. 13) to process a queue element from any queue that is ready for processing.

Figure 15:
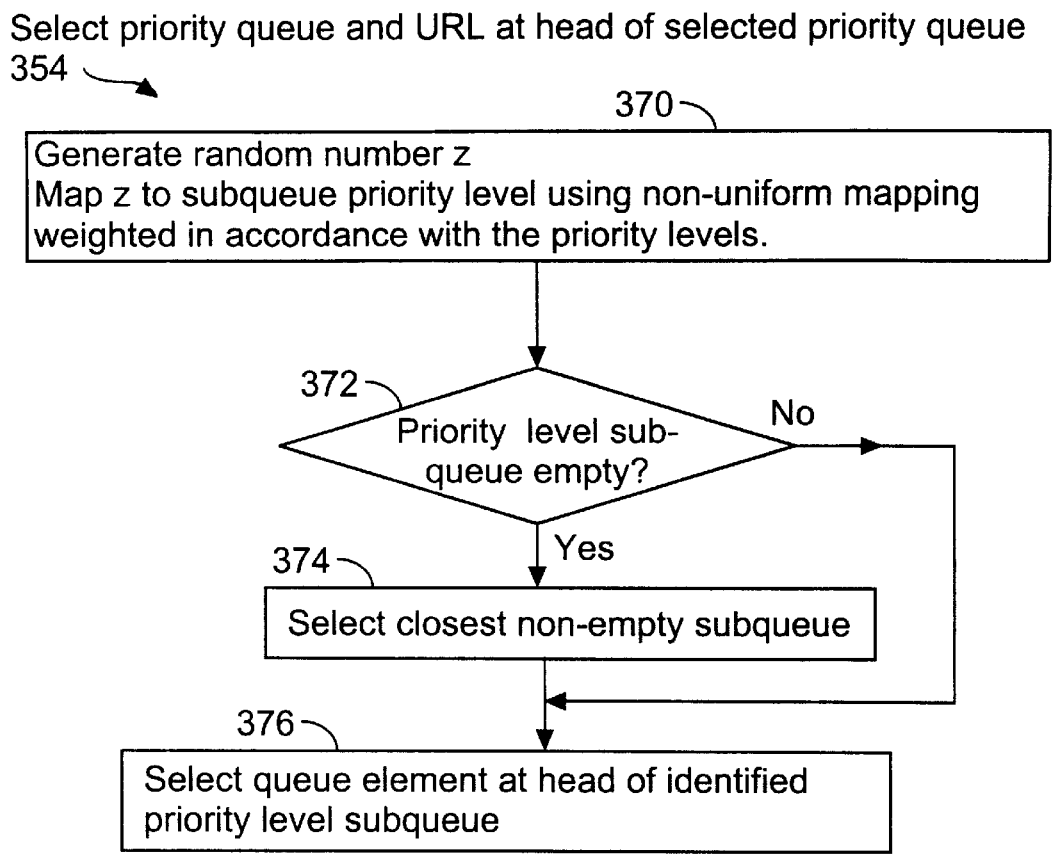

Referring to FIG. 15, the step of randomly selecting a priority level subqueue (354) in FIG. 14 includes randomly or pseudo-randomly generating a number, z, and then mapping z to one of the priority level subqueues using a non-uniform mapping that is weighted in accordance with the weights assigned to the priority level (370). The dequeue procedure checks to see if the selected priority level subqueue is empty (372). If so, then a subqueue closest to the selected subqueue is selected (374). Once a non-empty priority level subqueue has been selected, the queue element at the head of the selected subqueue is selected. (376).

Figure 16:
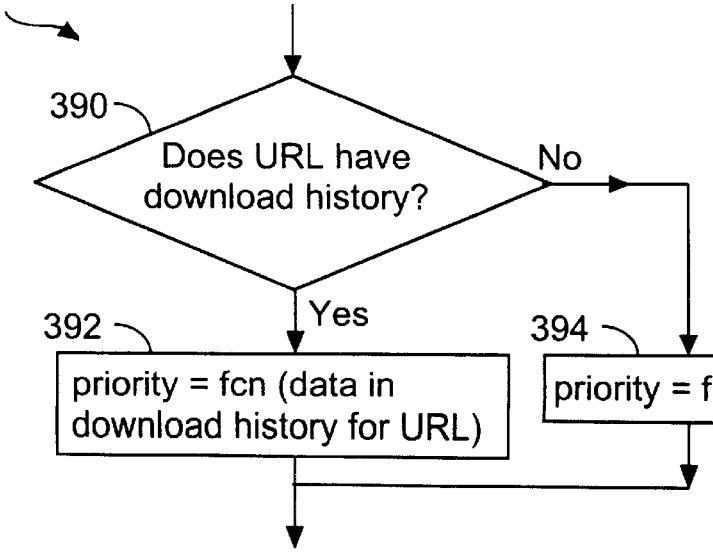

Referring to FIG. 16, the step 337A (FIG. 13) of determining a priority level for a next download of a document includes determining if the queue element for the document has a download history (390). That is, does the queue element have more than one record of download history information? If so (390-Yes), then the priority level for the next download is determined as a function of the document's download history in the queue element (392), using download history based criteria such as those discussed above. If not (390-No), then the priority level for the next download is determined as a function of the document's URL (394), using URL based criteria such as those discussed above. Alternately, if this is the first download of the document, the priority level can be determined from the purposed expiration date of the document.

In the second exemplary embodiment described above, when crawling in a network with a relatively small number of host computers, such as in an Intranet, some queues may be empty while other queues may contain URL's for multiple server hosts. Thus, in the second embodiment, parallelism may not be efficiently maintained, since the threads associated with the empty queues will be idle. The third embodiment described makes better use of thread capacity, on average, by dynamically reassigning queues to whichever hosts have pages that need processing. In both of these exemplary embodiments the same politeness policies may be enforced, whereby the web crawler not only does not submit overlapping download requests to any host, it waits between document downloads from each host for a period of time. The wait time between downloads from a particular host may be a constant value, or may be proportional to the download time of one or more previous documents downloaded from the host.

The foregoing examples illustrate certain exemplary embodiments of the invention from which other embodiments, variations and modifications will be apparent to those skilled in the art. The invention should therefore not be limited to the particular exemplary embodiments discussed herein, but rather defined by the claims appended hereto.

What is claimed is:

1. A method of performing a continuous crawl for locating and downloading documents from among a plurality of host computers, comprising:

(a) obtaining at least one referring document set that includes addresses of one or more referred documents; each referred document address including a host component;

(b) enqueuing queue elements in a plurality of queues, each queue element denoting one of the referred document addresses;

(c) substantially concurrently operating a plurality of threads;

(d) while operating each thread, repeatedly performing steps of:

(d1) identifying a queue element in a selected one of the queues, downloading a referred document corresponding to a referred document address in the identified queue element, and dequeuing the identified queue element; and (d2) executing at least one application program for processing the downloaded document;

the plurality of queues including a plurality of parallel priority level queues, each having a distinct associated download priority level, the download priority level corresponding to a probability of the queue elements enqueued in the associated priority level queue therein being processed by the threads; and step (d) including determining a download priority level for maintaining freshness of the downloaded document and re-enqueuing the queue element for the downloaded document in one of the parallel priority level queues in accordance with the determined download priority level.

2. The method of claim 1, wherein said enqueuing module is configured to use at least one of the downloaded referred documents as a new referring document.

3. The method of claim 1, wherein
the plurality of queues includes a front-end data structure and a back-end data structure, the front-end data structure including the plurality of parallel priority level queues, and the back-end data structure including a plurality of parallel first-in-first-out underlying queues;
step (b) includes enqueuing at least a subset of the queue elements in the priority level queues, each such queue element being enqueued in one of the priority level queues in accordance with a priority level associated with the queue element; and
step (d) includes transferring queue elements from the priority level queues to the underlying queues in accordance with the download priority levels of the priority level queues.

4. The method of claim 3, wherein step (b) includes enqueuing those of the referred data set addresses sharing a respective common host address into a respective common one of the underlying queues.

5. The method of claim 4, wherein referred data sets corresponding to referred data set addresses from different ones of the underlying queues are downloaded substantially concurrently, while referred data sets corresponding to referred data set addresses from any single one of the underlying queues are downloaded one at a time.

6. The method of claim 1, wherein the download priority level for each of a subset of the queue elements is determined as a function of an expiration date and time associated with document whose document address is denoted by the queue element.

7. The method of claim 1, wherein the download priority level for each of a subset of the queue elements is determined as a function of a host component of the document address denoted by the queue element.

8. The method of claim 1, wherein the download priority level for each of a subset of the queue elements is determined as a function of a historical rate of change of the document whose address is denoted by the queue element.

9. A method of performing a continuous crawl for locating and downloading documents from among a plurality of host computers, comprising:
   (a) obtaining at least one referring document set that includes addresses of one or more referred documents; each referred document address including a host component;
   (b) enqueuing queue elements in a plurality of queues, each queue element denoting one of the referred document addresses;
   (c) substantially concurrently operating a plurality of threads;
   (d) while operating each thread, repeatedly performing steps of:
      (d1) identifying a queue element in a selected one of the queues, downloading a referred document corresponding to a referred document address in the identified queue element, and dequeuing the identified queue element; and
      (d2) executing at least one application program for processing the downloaded document;
   the plurality of queues including a plurality of parallel priority level queues, each having a distinct associated download priority level, the download priority level corresponding to a probability of the queue elements enqueued in the associated priority level queue therein being processed by the threads; and
   step (b) including determining a download priority level for each queue element and enqueuing the queue element in one of the parallel priority level queues in accordance with the determined download priority level.

10. The method of claim 9, wherein the download priority level for each of a subset of the queue elements is determined as a function of the referred document address denoted by the queue element.

11. A computer program product for use in conjunction with a computer system, the computer program product comprising a computer readable storage medium and a computer program mechanism embedded therein, the computer program mechanism comprising:
   an enqueuing module that, when executed by the computer system, obtains at least one referring document that includes addresses of one or more referred documents, each referred document address including a host component corresponding to a host computer, and enqueues queue elements in a plurality of queues, each queue element denoting one of the referred document addresses; and
   a dequeuing module that is substantially concurrently executed by each of a plurality of threads so as to process the referred document addresses in the queues; the dequeuing module including instructions that, when executed by a respective one of the threads, repeatedly perform the functions of:
      (a1) identifying a queue element in a selected one of the queues, downloading a referred document corresponding to a referred document address in the identified queue element, and dequeuing the identified queue element;
      (a2) executing at least one application program for processing the downloaded document; and
      (a3) determining a download priority level for maintaining freshness of the downloaded document;
   the plurality of queues including a plurality of parallel priority level queues, each having a distinct associated download priority level, the download priority level corresponding to a probability of the queue elements enqueued in the associated priority level queue therein being processed by the threads; and
   the dequeuing module including instructions for re-enqueuing the queue element for the downloaded document in one of the parallel priority level queues in accordance with the download priority level determined for the queue element.

12. The computer program product of claim 11, wherein said enqueuing module is configured to use at least one of the downloaded referred documents as a new referring document.

13. The computer program product of claim 11, wherein
the plurality of queues includes a front-end data structure and a back-end data structure, the front-end data structure including the plurality of parallel priority level queues, and the back-end data structure including a plurality of parallel first-in-first-out underlying queues;

the enqueuing module includes instructions for enqueuing at least a subset of the queue elements in the priority level queues, each such queue element being enqueued in one of the priority level queues in accordance with a priority level associated with the queue element; and the dequeuing module includes instructions for transferring queue elements from the priority level queues to the underlying queues in accordance with the download priority levels of the priority level queues.

14. The computer program product of claim 13, wherein the enqueuing module includes instructions for enqueuing those of the referred data set addresses sharing a respective common host address into a respective common one of the underlying queues.

15. The computer program product of claim 14, wherein referred data sets corresponding to referred data set addresses from different ones of the underlying queues are downloaded substantially concurrently, while referred data sets corresponding to referred data set addresses from any single one of the underlying queues are downloaded one at a time.

16. The computer program product of claim 11, wherein the download priority level for each of a subset of the queue elements is determined as a function of an expiration date and time associated with document whose document address is denoted by the queue element.

17. The computer program product of claim 11, wherein the download priority level for each of a subset of the queue elements is determined as a function of a host component of the document address denoted by the queue element.

18. The computer program product of claim 11, wherein the download priority level for each of a subset of the queue elements is determined as a function of a historical rate of change of the document whose address is denoted by the queue element.

19. A computer program product for use in conjunction with a computer system, the computer program product comprising a computer readable storage medium and a computer program mechanism embedded therein, the computer program mechanism comprising:

an enqueuing module that, when executed by the computer system, obtains at least one referring document that includes addresses of one or more referred documents, each referred document address including a host component corresponding to a host computer, and enqueues queue elements in a plurality of queues, each queue element denoting one of the referred document addresses; and a dequeuing module that is substantially concurrently executed by each of a plurality of threads so as to process the referred document addresses in the queues; the dequeuing module including instructions that, when executed by a respective one of the threads, repeatedly perform the functions of:

(a1) identifying a queue element in a selected one of the queues, downloading a referred document corresponding to a referred document address in the identified queue element, and dequeuing the identified queue element; and (a2) executing at least one application program for processing the downloaded document;

the plurality of queues including a plurality of parallel priority level queues, each having a distinct associated download priority level, the download priority level corresponding to a probability of the queue elements enqueued in the associated priority level queue therein being processed by the threads; and the enqueuing module including instructions for determining a download priority level for each queue element and enqueuing the queue element in one of the parallel priority level queues in accordance with the determined download priority level.

20. The computer program product of claim 19, wherein the download priority level for each of a subset of the queue elements is determined as a function of the referred document address denoted by the queue element.

21. A web crawler for downloading documents from among a plurality of host computers, comprising:

at least one central processing unit;

a plurality of threads of execution that are executed by the at least one central processing unit;

memory for storing a plurality of queues;

an enqueuing module that, when executed by the computer system, obtains at least one referring document that includes addresses of one or more referred documents, each referred document address including a host component corresponding to a host computer, and enqueues queue elements in the plurality of queues; and a dequeuing module that is substantially concurrently executed by each of a plurality of threads so as to process the referred document addresses in the queues; the dequeuing module including instructions that, when executed by a respective one of the threads, repeatedly perform the functions of:

(a1) identifying a queue element in a selected one of the queues, downloading a referred document corresponding to a referred document address in the identified queue element, and dequening the identified queue element;

(a2) executing at least one application program for processing the downloaded document; and (a3) determining a download priority level for maintaining freshness of the downloaded document;

the plurality of queues including a plurality of parallel priority level queues, each having a distinct associated download priority level, the download priority level corresponding to a probability of the queue elements enqueued in the associated priority level queue therein being processed by the threads; and the dequeuing module including instructions for re-enqueuing the queue element for the downloaded document in one of the parallel priority level queues in accordance with the download priority level determined for the queue element.

22. The web crawler of claim 21, wherein said enqueuing module is configured to use at least one of the downloaded referred documents as a new referring document.

23. The web crawler of claim 21, wherein the plurality of queues includes a front-end data structure and a back-end data structure, the front-end data structure including the plurality of parallel priority level queues, and the back-end data structure including a plurality of parallel first-in-first-out underlying queues;

the enqueuing module includes instructions for enqueuing at least a subset of the queue elements in the priority level queues, each such queue element being enqueued in one of the priority level queues in accordance with a priority level associated with the queue element; and the dequeuing module includes instructions for transferring queue elements from the priority level queues to the underlying queues in accordance with the download priority levels of the priority level queues.

24. The web crawler of claim 23, wherein the enqueuing module includes instructions for enqueuing those of the referred data set addresses sharing a respective common host address into a respective common one of the underlying queues.

25. The web crawler of claim 24, wherein referred data sets corresponding to referred data set addresses from different ones of the underlying queues are downloaded substantially concurrently, while referred data sets corresponding to referred data set addresses from any single one of the underlying queues are downloaded one at a time.

26. The web crawler of claim 21, wherein the download priority level for each of a subset of the queue elements is determined as a function of an expiration date and time associated with document whose document address is denoted by the queue element.

27. The web crawler of claim 21, wherein the download priority level for each of a subset of the queue elements is determined as a function of a host component of the document address denoted by the queue element.

28. The web crawler of claim 21, wherein the download priority level for each of a subset of the queue elements is determined as a function of a historical rate of change of the document whose address is denoted by the queue element.

29. A web crawler for downloading documents from among a plurality of host computers, comprising:

at least one central processing unit;

a plurality of threads of execution that are executed by the at least one central processing unit;

memory for storing a plurality of queues;

an enqueuing module that, when executed by the computer system, obtains at least one referring document that includes addresses of one or more referred documents, each referred document address including a host component corresponding to a host computer, and enqueues queue elements in the plurality of queues; and a dequeuing module that is substantially concurrently executed by each of a plurality of threads so as to process the referred document addresses in the queues; the dequeuing module including instructions that, when executed by a respective one of the threads, repeatedly perform the functions of:

(a1) identifying a queue element in a selected one of the queues, downloading a referred document corresponding to a referred document address in the identified queue element, and dequeuing the identified queue element; and (a2) executing at least one application program for processing the downloaded document;

the plurality of queues including a plurality of parallel priority level queues, each having a distinct associated download priority level, the download priority level corresponding to a probability of the queue elements enqueued in the associated priority level queue therein being processed by the threads; and the enqueuing module including instructions for determining a download priority level for each queue element and enqueuing the queue element in one of the parallel priority level queues in accordance with the determined download priority level.

30. The web crawler of claim 29, wherein the download priority level for each of a subset of the queue elements is determined as a function of the referred document address denoted by the queue element.

* * * * *